(12) United States Patent
Lee et al.

(10) Patent No.: US 11,565,608 B2
(45) Date of Patent: Jan. 31, 2023

(54) SYSTEM AND METHOD FOR CONTROLLING LOW VOLTAGE DC CONVERTER OF FUEL CELL VEHICLE

(71) Applicants: Hyundai Motor Company, Seoul (KR); Kia Corporation, Seoul (KR)

(72) Inventors: Sang Kyu Lee, Gyeonggi-do (KR); Tae Woo Kim, Gyeonggi-do (KR); Se La Lim, Gyeonggi-do (KR); Won Seok Jin, Chungcheongnam-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/410,373

(22) Filed: Aug. 24, 2021

(65) Prior Publication Data

US 2022/0305956 A1     Sep. 29, 2022

(30) Foreign Application Priority Data

Mar. 23, 2021 (KR) ........................ 10-2021-0037129

(51) Int. Cl.
*B60L 58/40* (2019.01)
*B60L 50/75* (2019.01)

(52) U.S. Cl.
CPC ............... *B60L 58/40* (2019.02); *B60L 50/75* (2019.02)

(58) Field of Classification Search
None
See application file for complete search history.

(56) References Cited

U.S. PATENT DOCUMENTS

| 6,169,675 | B1 * | 1/2001 | Shimamori | H02M 3/285 |
| | | | | 363/127 |
| 2015/0280546 | A1 * | 10/2015 | Kouno | H02M 7/53871 |
| | | | | 363/132 |
| 2018/0069254 | A1 * | 3/2018 | Lee | H01M 8/04302 |
| 2018/0123152 | A1 * | 5/2018 | Matsumoto | H01M 8/04223 |

FOREIGN PATENT DOCUMENTS

KR    20180027682 A    3/2018

* cited by examiner

*Primary Examiner* — Jared Fureman
*Assistant Examiner* — Joel Barnett
(74) *Attorney, Agent, or Firm* — Fox Rothschild LLP

(57) ABSTRACT

A system and method are arranged to control a low voltage DC converter of a fuel cell vehicle, in which, although a CAN communication timeout where the low voltage DC converter does not receive an off command from a vehicle control unit or a CAN communication failure occurs, when an output current of the low voltage DC converter is lowered by at least a predetermined value, the low voltage DC converter is turned off by itself by determining that a post-treatment operation of a fuel cell system is completed, and after the low voltage DC converter is turned off, a relay of a high voltage battery is opened, thereby preventing the relay of the high voltage battery from fusing.

8 Claims, 4 Drawing Sheets

SYSTEM AND METHOD FOR CONTROLLING LOW VOLTAGE DC CONVERTER OF FUEL CELL VEHICLE

CROSS-REFERENCE TO RELATED APPLICATION

This application claims under 35 U.S.C. § 119(a) the benefit of Korean Patent Application No. 10-2021-0037129 filed on Mar. 23, 2021, the entire contents of which are incorporated herein by reference.

BACKGROUND

(a) Technical Field

The present disclosure relates to a method for controlling a low voltage DC converter of a fuel cell vehicle, more particularly, to the method for controlling the low voltage DC converter of the fuel cell vehicle, which is capable of preventing a relay of a high voltage battery from fusing.

(b) Description of the Related Art

Typically, a fuel cell system mounted on a fuel cell vehicle includes a fuel cell stack, a hydrogen supply system which supplies hydrogen to the fuel cell stack, an air supply system which supplies air to the fuel cell stack, and a heat and water management system for discharging heat, water, etc., which are electrochemical reaction by-products of the fuel cell stack, to the outside.

A post-treatment operation of the fuel cell system and a power control process thereof are performed in order to safely stop the fuel cell system after the ignition is turned off ("IG off") of the fuel cell vehicle.

FIG. 1 (RELATED ART) is a flow chart showing a post-treatment operation of a fuel cell system and a power control method thereof.

First, after IG off of a fuel cell vehicle (S1), a post-treatment operation of the fuel cell system for safely stopping the fuel cell system is performed (S2).

To this end, in order to stably supply power to various control units for the post-treatment operation of the fuel cell system, a current output of a low voltage DC converter (LDC) continues even after IG off.

For example, the post-treatment operation, such as capturing water, generated by the operation of the fuel cell system, with a water trap, is performed, and various control units which control the post-treatment operation consume a current outputting from the low voltage DC converter.

Subsequently, when the post-treatment operation of the fuel cell system is completed, a vehicle control unit (VCU), which is a highest control unit of the fuel cell vehicle, orders an off command to the low voltage DC converter (S3).

Accordingly, the low voltage DC converter is turned off according to the off command of the vehicle control unit (S4).

At this time, a current does not flow from the low voltage DC converter to a relay of a high voltage battery as the low voltage DC converter is turned off, so that a relay current becomes 0 A (S5).

After the low voltage DC converter is turned off, the relay of the high voltage battery is opened by the control of a battery control unit in order to turn off the fuel cell system which consumes power of the high voltage battery (S6).

However, upon occurrence of a CAN communication timeout, which is a kind of communication trouble in which the low voltage DC converter does not receive the off command from the vehicle control unit, or upon occurrence of a CAN communication failure between the vehicle control unit and the low voltage DC converter, a current eventually continues to flow from low voltage DC converter to the relay of the high voltage battery, and thus a problem is caused in that there occurs a phenomenon in which the relay is fused when the relay is open.

In particular, as shown in the flow chart of FIG. 2 (RELATED ART), even if the vehicle control unit orders the off command to the low voltage DC converter as the post-treatment operation of the fuel cell system is completed, when a CAN communication timeout or a CAN communication failure occurs as described above, the low voltage DC converter does not recognize the off command and thus continues to operate. Accordingly, as a current continues to flow from the low voltage DC converter to the relay of the high voltage battery, a problem is caused in that there occurs a phenomenon in which the relay is fused when the relay is open.

Moreover, if the relay of the high voltage battery is fused in an open state, the vehicle may be subject to a safety-related problem, such as being unable to use the power of the high voltage battery in a driving motor or the like when the fuel cell vehicle is turned on again.

SUMMARY

The present disclosure provides a system and method for controlling a low voltage DC converter of a fuel cell vehicle, in which, although a CAN communication timeout where the low voltage DC converter does not receive an off command from a vehicle control unit or a CAN communication failure occurs, when an output current of the low voltage DC converter is lowered by at least a predetermined value, the low voltage DC converter is turned off by itself by determining that a post-treatment operation of a fuel cell system is completed, and after the low voltage DC converter is turned off, a relay of a high voltage battery is opened, thereby preventing the relay of the high voltage battery from fusing.

A method for controlling a low voltage DC converter of a fuel cell vehicle according to one embodiment of the present disclosure may include: the low voltage DC converter outputting a current to a control unit for a post-treatment operation of a fuel cell system by converting a voltage of a high voltage battery into a low voltage; a relay mounted on a conductive line connecting between the high voltage battery and the low voltage DC converter; and a vehicle control unit ordering an off command to the low voltage DC converter when a post-treatment of the fuel cell system is completed, wherein, in case the low voltage DC converter does not receive the off command of the vehicle control unit, when an output current of the low voltage DC converter is lowered by at least a predetermined value, so that the low voltage DC converter turns off by itself.

The low voltage DC converter outputs a current for a post-treatment to a control unit for the post-treatment operation after a fuel cell vehicle turns off, and when the current outputted to the control unit for the post-treatment operation is lowered by at least a predetermined value, it is determined that the post-treatment operation of the fuel cell system is completed, so that the low voltage DC converter is configured to turn off by itself.

The low voltage DC converter is configured to output a signal for turning off the low voltage DC converter itself to a battery control unit.

The battery control unit is configured to control to be open a relay of a high voltage battery when the battery control unit receives an off signal of the low voltage DC converter.

Another exemplary embodiment of the present disclosure for achieving the object provides a method for controlling a low voltage DC converter of a fuel cell vehicle including: turning off a fuel cell vehicle; performing a post-treatment operation of the fuel cell system by outputting a current from the low voltage DC converter to a control unit for the post-treatment operation of the fuel cell system; and turning off the low voltage DC converter by itself when an output current of the low voltage DC converter falls below a predetermined value, in case the low voltage DC converter does not receive an off command of a vehicle control unit.

When an output current outputted from the low voltage DC converter to a control unit for a post-treatment operation of a fuel cell system falls below a predetermined value, the low voltage DC converter determines that the post-treatment operation of the fuel cell system is completed, thereby turning off by itself.

The step of outputting a signal for turning off the low voltage DC converter itself to a battery control unit is further performed.

The control step to open a relay of a high voltage battery when the battery control unit receives an off signal of the low voltage DC converter is performed.

The present disclosure provides the following effects through the above configurations.

First, although a CAN communication timeout in which the low voltage DC converter does not receive an off command from the vehicle control unit or a CAN communication failure occurs after a post-treatment operation of a fuel cell system is completed, the low voltage DC converter may be easily turned off by itself by determining that the post-treatment operation of the fuel cell system is completed when an output current of the low voltage DC converter is lowered by at least a predetermined value.

Second, after the low voltage DC converter is turned off by itself, a battery control unit controls a relay of a high voltage battery to open. As a consequence, the opening of the relay may be performed in a state in which no current always flows from the low voltage DC converter to the relay of the high voltage battery, and accordingly, it is possible to prevent the relay from fusing upon opening of the relay.

Other aspects and preferred embodiments of the present disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
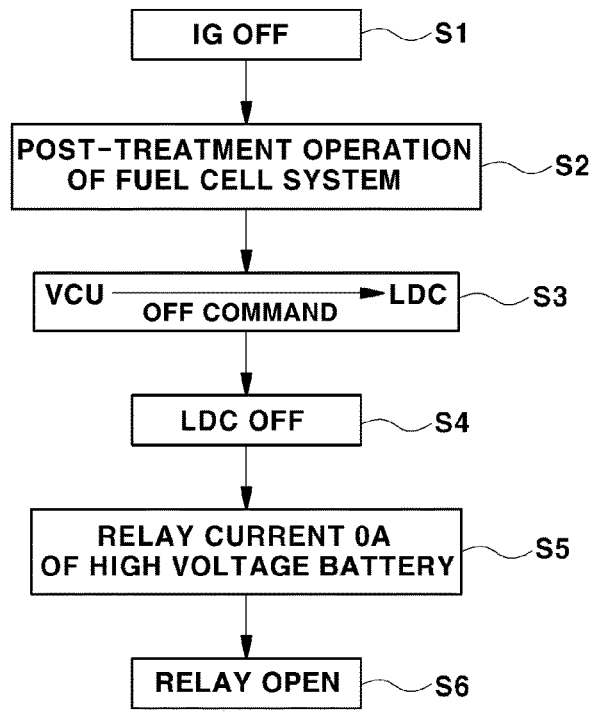
FIG. 1 (RELATED ART) is a flow chart showing a post-treatment operation of a conventional fuel cell system and a power control method thereof.
Figure 2:
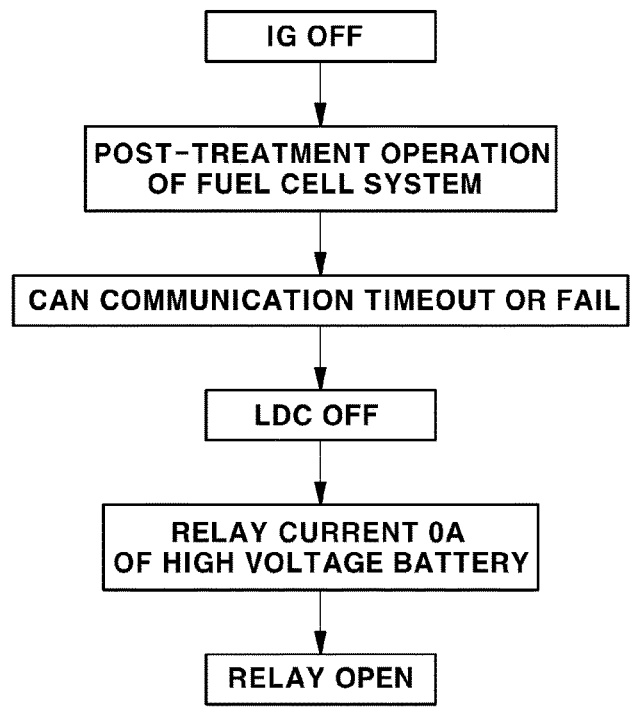
FIG. 2 (RELATED ART) is a flow chart showing a problem in the post-treatment operation of the conventional fuel cell system and the power control method thereof.

It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, preferred embodiments of the present disclosure will be described in detail with reference to the attached drawings. Items shown in the drawings are schematically illustrated so as to easily describe the embodiments of the present disclosure, and thus the items may be different from those actually implemented.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Figure 3:
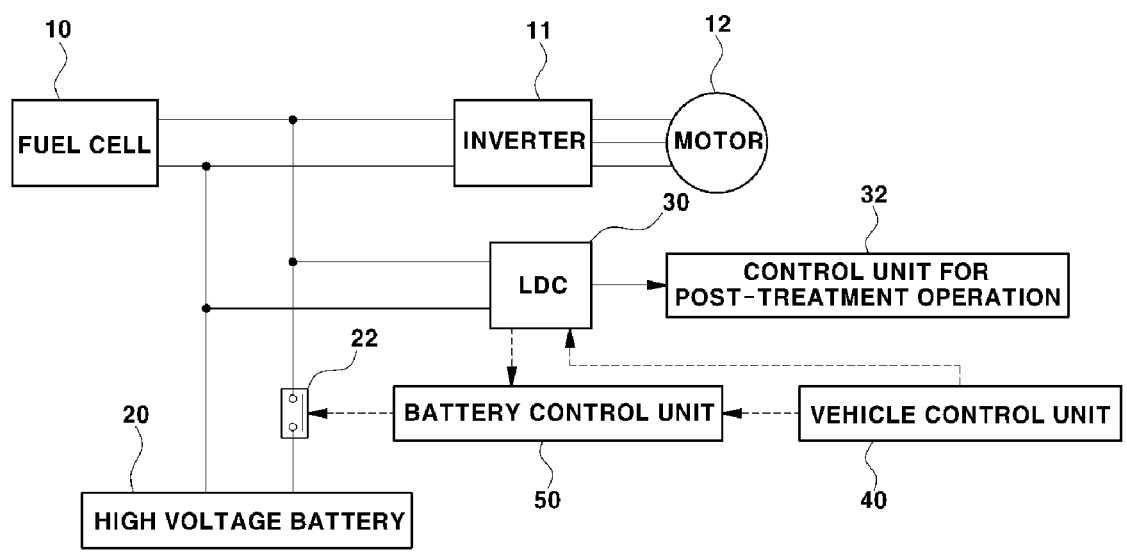
FIG. 3 is a configuration diagram illustrating a system for controlling a low voltage DC converter of a fuel cell vehicle according to the present disclosure.

FIG. 3 is a configuration diagram illustrating a system for controlling a low voltage DC converter of a fuel cell vehicle according to the present disclosure.

As illustrated in FIG. 3, a part of electric energy generated by a fuel cell 10 is supplied to a driving motor 12 through an inverter 11, so that the fuel cell vehicle may be driven.

As illustrated in FIG. 3, a part of an electric energy generated by a fuel cell 10 is supplied to a driving motor 12 through an inverter 11, so that a fuel cell vehicle may be driven.

The remaining part of the electric energy generated by the fuel cell 10 may be used to charge a high voltage battery 20, and electric energy obtained due to regenerative braking of the motor 12 may also be used to charge the high voltage battery 20.

A relay 22 for allowing or blocking discharge of the high voltage battery 20 is mounted on a conductive line extending from the high voltage battery 20 to the inverter 11.

A low voltage DC converter 30 is connected to the conductive line extending from the relay 22 of the high voltage battery 20 to the inverter 11.

Accordingly, the relay 22 is located on the conductive line connecting between the high voltage battery 20 and the low voltage DC converter 30.

The low voltage DC converter 30 converts a voltage of the high voltage battery 20 into a low voltage (for example, 12 V) for charging an auxiliary battery or supplying a low voltage current to various accessory parts and so on including a control unit 32 for a post-treatment operation of a fuel cell system.

In addition, a vehicle control unit 40 which orders an off command when the post-treatment of the fuel cell system is completed is connected to the low voltage DC converter 30 through a CAN communication line.

In addition, a battery control unit 50 for receiving an off signal of the low voltage DC converter 30 and thereby controlling the relay 22 of the high voltage battery 20 to be open is connected to the low voltage DC converter 30 in such a way to be capable of communication therewith.

In particular, the low voltage DC converter 30 is disposed to output a current for post-treatment to the control unit 32 for the post-treatment operation of the fuel cell system after IG off of the fuel cell vehicle, and to be turned off by itself by determining that the post-treatment operation of the fuel cell system is completed, when the current outputted to the control unit 32 for the post-treatment operation is lowered by at least a predetermined value.

In other words, the low voltage DC converter 30 is configured to monitor by itself whether the output current outputted to the control unit for the post-treatment operation of the fuel cell system has been lowered by at least the predetermined value and to turn itself off when the output current is lowered by at least the predetermined value.

In particular, the low voltage DC converter 30 is disposed to output a current for post-treatment to the control unit 32 for the post-treatment operation of the fuel cell system after IG off of the fuel cell vehicle, where the low voltage DC converter 30 is configured to turn itself off upon determining that the post-treatment operation of the fuel cell system is completed, if the current outputted to the control unit 32 for the post-treatment operation is lowered by at least the predetermined value and if the low voltage DC converter 30 does not receive the off command from the vehicle control unit 40.

For example, in PWM on/off control, a switching circuit maintains a turned-on state at a current equal to or greater than a predetermined magnitude and is turned off at a current less than the predetermined magnitude, is built in the low voltage DC converter 30. As a consequence, when the current outputted from the low voltage DC converter 30 to the control unit 32 for the post-treatment operation is lowered by at least the predetermined value, the low voltage DC converter 30 may be turned off by itself by determining that the post-treatment operation of the fuel cell system is completed.

Further, the low voltage DC converter 30 is configured to output a signal for turning off the low voltage DC converter 30 itself to the battery control unit 50, and the battery control unit 50 is configured to control the relay 22 of the high voltage battery 20 to be open, when the battery control unit 50 receives the off signal of the low voltage DC converter 30.

Hereinafter, a method for controlling the low voltage DC converter 30 according to the present disclosure implemented based on the above-described configuration will be explained in order.

Figure 4:
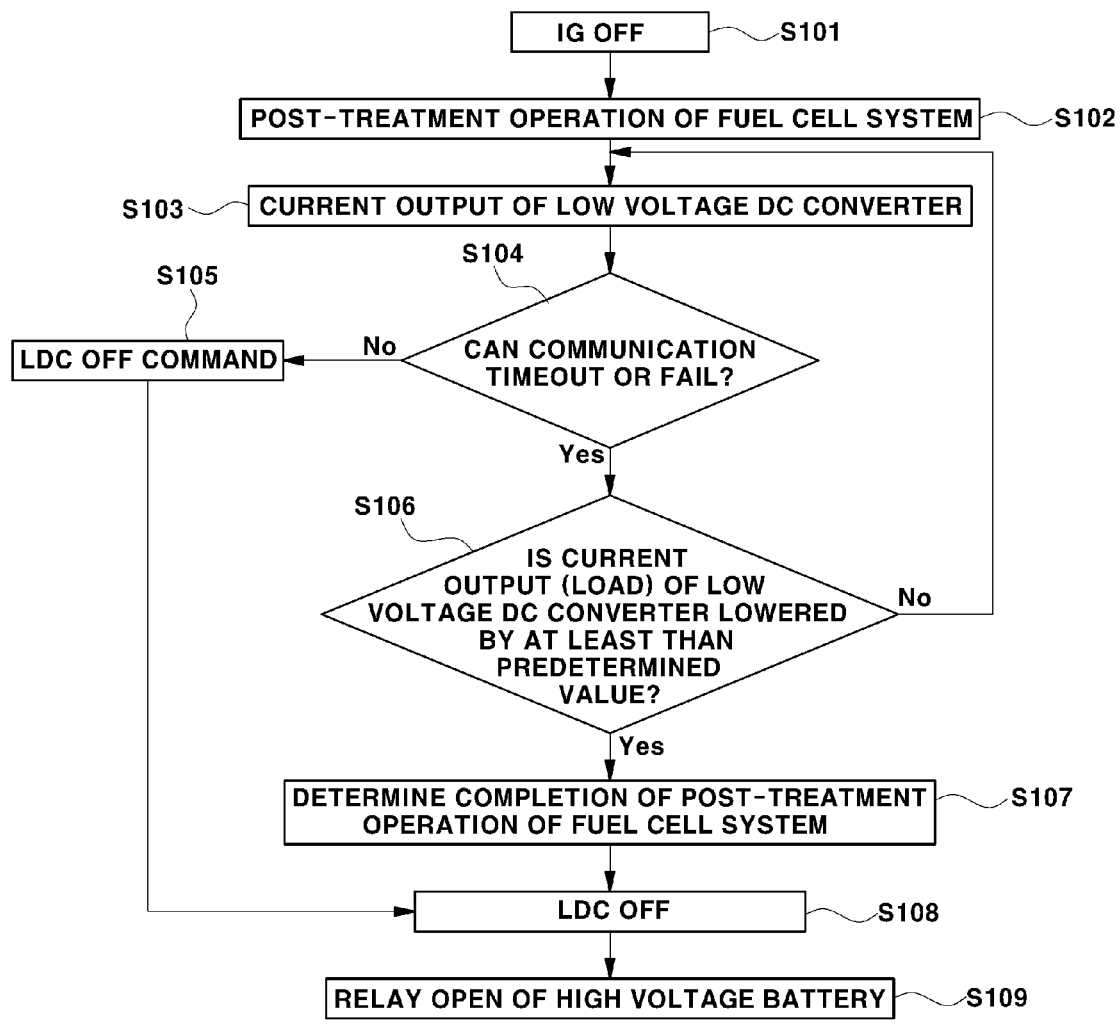
FIG. 4 is a flow chart showing a method for controlling a low voltage DC converter of a fuel cell vehicle according to the present disclosure.
Figure 5:
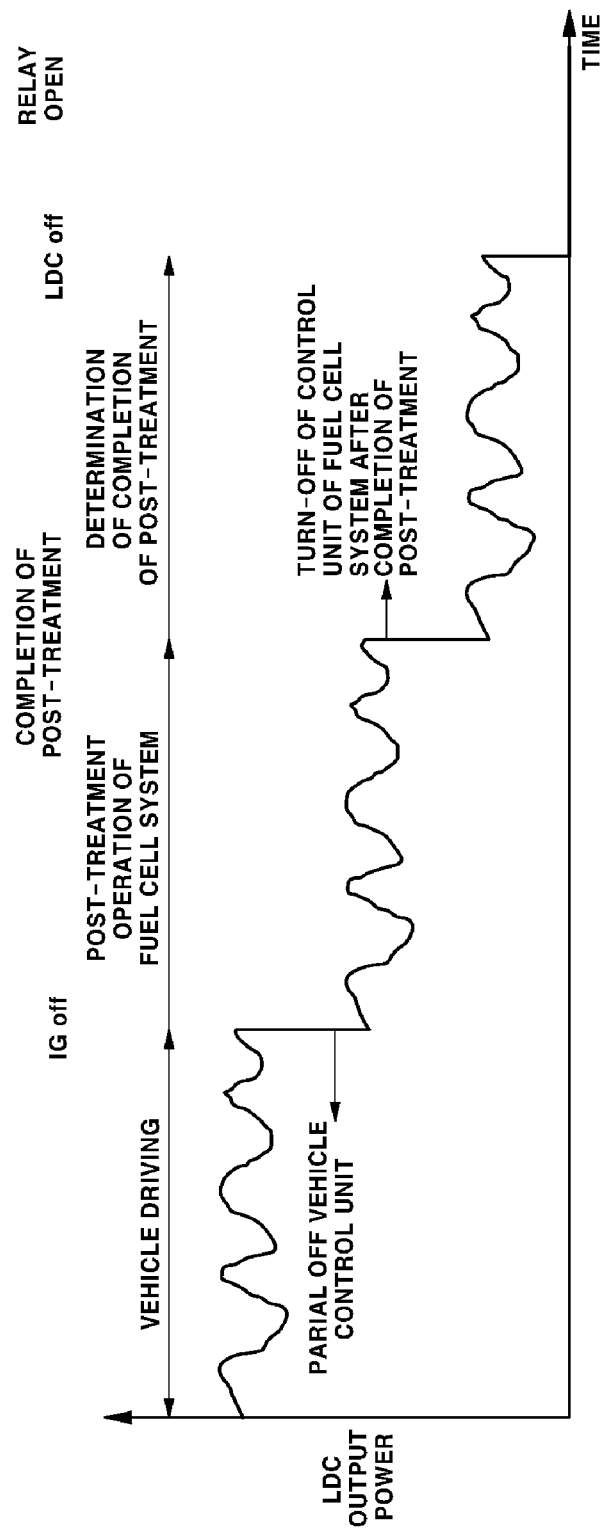
FIG. 5 is a waveform diagram of an output current of the low voltage DC converter for explaining the method for controlling a low voltage DC converter of a fuel cell vehicle according to the present disclosure.

FIG. 4 is a flow chart showing a method for controlling a low voltage DC converter of a fuel cell vehicle according to the present disclosure, and FIG. 5 is a waveform diagram of an output current of the low voltage DC converter for explaining the method for controlling a low voltage DC converter of a fuel cell vehicle according to the present disclosure.

First, after IG off of the fuel cell vehicle (S101), the post-treatment operation of the fuel cell system for safely stopping the fuel cell system is performed (S102).

To this end, in order to stably supply power to the control unit 32 for the post-treatment operation of the fuel cell system, a current output of the low voltage DC converter 30 continues even after the IG off (S103).

For example, a post-treatment operation, such as capturing water, generated by the operation of the fuel cell system, with a water trap, is performed, and various control units 32 which control such a post-treatment operation consume the current outputted from the low voltage DC converter 30.

Subsequently, when the post-treatment operation of the fuel cell system is completed, the vehicle control unit 40 as a highest control unit of the fuel cell vehicle orders an off command to the low voltage DC converter 30.

That is to say, it is checked whether a CAN communication timeout or a CAN communication failure between the vehicle control unit 40 and the low voltage DC converter 30 has occurred (S104), and as a result of checking, when it is a normal state in which the CAN communication timeout or the CAN communication failure has not occurred, the off command from the vehicle control unit 40 is normally ordered to the low voltage DC converter 30 (S105).

Accordingly, the low voltage DC converter 30 is turned off according to the off command of the vehicle control unit 40 (S108).

At this time, as the low voltage DC converter 30 is normally turned off, a current does not flow from the low voltage DC converter 30 to the relay 22 of the high voltage battery 20, so that a relay current becomes 0 A.

After the low voltage DC converter 30 is turned off, the relay 22 of the high voltage battery 20 is opened by the control of the battery control unit 50 to turn off the fuel cell system which consumes the power of the high voltage battery 20 (S109).

However, as described above, when the CAN communication timeout such as a kind of communication trouble in which the low voltage DC converter 30 does not receive the off command from the vehicle control unit 40 occurs or the CAN communication failure between the vehicle control unit 40 and the low voltage DC converter 30 occurs, the low voltage DC converter 30 is not turned off and operates continuously, so that a current continues to flow from the low voltage DC converter 30 to the relay 22 of the high voltage battery 20, and due to this fact, there is caused a problem in that a phenomenon in which the relay 22 is fused when the relay 22 is opened occurs.

In particular, even though the vehicle control unit 40 orders an off command to the low voltage DC converter 30 as the post-treatment operation of the fuel cell system is completed, if the CAN communication timeout or the CAN communication failure occurs as described above, the low voltage DC converter 30 does not recognize the off command and operates continuously. Accordingly, as a current continues to flow from low voltage DC converter 30 to the relay 22 of the high voltage battery 20, there is caused a problem in that a phenomenon in which the relay 22 is fused when the relay 22 is opened occurs.

In order to solve this problem, if the low voltage DC converter 30 does not receive the off command from the vehicle control unit 40, the low voltage DC converter 30 may be turned off by itself when the output current of the low voltage DC converter 30 is lowered by at least the predetermined value.

In particular, as a result of checking at the step S104 described above, when it is checked that the CAN communication timeout such as a kind of communication trouble in which the low voltage DC converter 30 does not receive the off command from the vehicle control unit 40 has occurred, or the CAN communication failure between the vehicle control unit 40 and the low voltage DC converter 30 has occurred, the low voltage DC converter 30 does not receive the off command from the vehicle control unit 40. Therefore, the low voltage DC converter 30 may be turned off by itself when the output current thereof is lowered by at least the predetermined value.

To this end, the low voltage DC converter 30 self-monitors whether the output current outputted to the control unit for the post-treatment operation of the fuel cell system is lowered by at least the predetermined value (S106).

As a result of monitoring, when the output current thereof is lowered by at least the predetermined value, the low voltage DC converter 30 determines that the post-treatment operation of the fuel cell system was completed (S107).

Referred to FIG. 5, after IG off of the fuel cell vehicle, the post-treatment operation by the control unit 32 for the post-treatment operation of the fuel cell system, using the output current of the low voltage DC converter 30, is performed. When the post-treatment operation is completed, the control unit 32 for the post-treatment operation is turned off, and thus, the output current of the low voltage DC converter 30 is lowered by at least the predetermined value as indicated by "A" in FIG. 5.

Accordingly, when the output current of the low voltage DC converter 30 is lowered by at least the predetermined value, the low voltage DC converter 30 is turned off by itself by determining that the post-treatment operation of the fuel cell system is completed (S108).

As the low voltage DC converter 30 is turned off by itself, a current does not flow from the low voltage DC converter 30 to the relay 22 of the high voltage battery 20, so that a relay current becomes 0 A.

Then, when the signal of the low voltage DC converter 30 for turning off the low voltage DC converter 30 itself is transmitted to the battery control unit 50, the relay 22 of the high voltage battery 20 is opened by the control of the battery control unit 50 (S109)

Accordingly, after the low voltage DC converter 30 is turned off by itself, the battery control unit 50 controls the relay 22 of the high voltage battery 20 to be open. Therefore, the opening of relay 22 may be performed always in a state in which a current does not flow from the low voltage DC converter 30 to the relay 22 of the battery control unit 50, and accordingly, it is possible to prevent the relay 22 from fusing upon opening of the relay 22.

Although an embodiment of the present disclosure has been described in detail, the scope of the prevent disclosure is not limited to the described embodiment, and various modifications and improvements devised by those skilled in the art using the fundamental concept of the present disclosure, which is defined by the appended claims, further fall within the scope of the present disclosure.

What is claimed is:

1. A system for controlling a low voltage DC converter of a fuel cell vehicle, comprising:
the low voltage DC converter configured to output a current to a control unit for a post-treatment operation of a fuel cell system by converting a voltage of a high voltage battery into a low voltage;
a relay mounted on a conductive line between the high voltage battery and the low voltage DC converter; and
a vehicle control unit configured to order an off command to the low voltage DC converter when the post-treatment operation of the fuel cell system is completed,
wherein, if the low voltage DC converter does not receive the off command from the vehicle control unit, when an output current of the low voltage DC converter is lowered by at least a predetermined value, the low voltage DC converter is turned off by the low voltage DC converter itself.

2. The system of claim 1, wherein the low voltage DC converter outputs a current for the post-treatment operation to a control unit after IG off of the fuel cell vehicle, and when the current outputted to the control unit for the post-treatment operation is lowered by at least the predetermined value, the low voltage DC converter is turned off by the low voltage DC converter itself by determining that the post-treatment operation of the fuel cell system is completed.

3. The system of claim 1, wherein the low voltage DC converter is configured to output a signal for turning off the low voltage DC converter itself to a battery control unit.

4. The system of claim 3, wherein the battery control unit is configured to open a relay of a high voltage battery when an off signal of the low voltage DC converter is received.

5. A method for controlling a low voltage DC converter of a fuel cell vehicle, comprising:
turning off, by a vehicle control unit, an ignition of a fuel cell vehicle;
performing, by the low voltage DC converter, a post-treatment operation of a fuel cell system by outputting a current from the low voltage DC converter to a control unit for the post-treatment operation of the fuel cell system; and
turning off the low voltage DC converter, by the low voltage DC converter itself, when an output current of the low voltage DC converter is lowered by at least a predetermined value, if the low voltage DC converter does not receive an off command from the vehicle control unit.

6. The method of claim 5, wherein when the output current outputted from the low voltage DC converter to the control unit for the post-treatment operation of the fuel cell system is lowered by at least the predetermined value, the low voltage DC converter is turned off by the low voltage DC converter itself by determining that the post-treatment operation of the fuel cell system is completed.

7. The method of claim 5, further comprising:
outputting a signal, by the low voltage DC converter, for turning off the low voltage DC converter itself to a battery control unit.

8. The method of claim 7, further comprising:
opening a relay of a high voltage battery when the battery control unit receives an off signal of the low voltage DC converter.

\* \* \* \* \*